United States Patent [19]

Tremblay et al.

[11] Patent Number: 4,635,989
[45] Date of Patent: Jan. 13, 1987

[54] CABLE CLAMPING DEVICE

[75] Inventors: Paul Tremblay, Point-aux-Trembles; Georges Tzabanakis, Montreal, both of Canada

[73] Assignee: Tekna Recherche & Developpement Inc., Canada

[21] Appl. No.: 682,768

[22] Filed: Dec. 18, 1984

[51] Int. Cl.⁴ .................. F16G 11/10; B65H 59/00
[52] U.S. Cl. .................. 294/102.1; 254/134.3 FT; 403/275
[58] Field of Search ............. 294/102.1, 100; 403/285, 392, 353, 275, 274, 343, 281, 277, 284, 215; 174/79; 254/134.3 FT; 411/411, 412

[56] References Cited

U.S. PATENT DOCUMENTS

| | | | |
|---|---|---|---|
| 2,339,671 | 1/1944 | Bergman | 403/275 |
| 3,226,470 | 12/1965 | Bryant | 174/79 |
| 3,306,970 | 2/1967 | Kowalski | 174/79 |
| 3,544,142 | 12/1970 | Moss, Jr. | 403/275 |
| 3,675,898 | 7/1972 | Fattor et al. | 254/134.3 FT |
| 3,776,586 | 12/1973 | Ahlgren et al. | 294/102.1 |
| 3,858,992 | 1/1975 | Eucker | 403/275 |
| 4,337,923 | 7/1982 | Smith | 403/275 |
| 4,432,663 | 2/1984 | Lasak et al. | 403/275 |

Primary Examiner—James B. Marbert
Attorney, Agent, or Firm—Steele, Gould & Fried

[57] ABSTRACT

The disclosure herein describes a device for clamping the stripped end of a cable having a strength member extending centrally of the cable and projecting from the stripped end thereof; the device includes a body having one end defining a tapered socket and a wedge member cooperatingly engaging the socket and adapted to receive centrally thereof the projecting strength member; a wedge driving member engages the socket end of the body to force the wedge member in the tapered socket and to tightly grip the strength member of the cable. This clamping device is particularly useful for fiber optic carrying cables.

10 Claims, 8 Drawing Figures

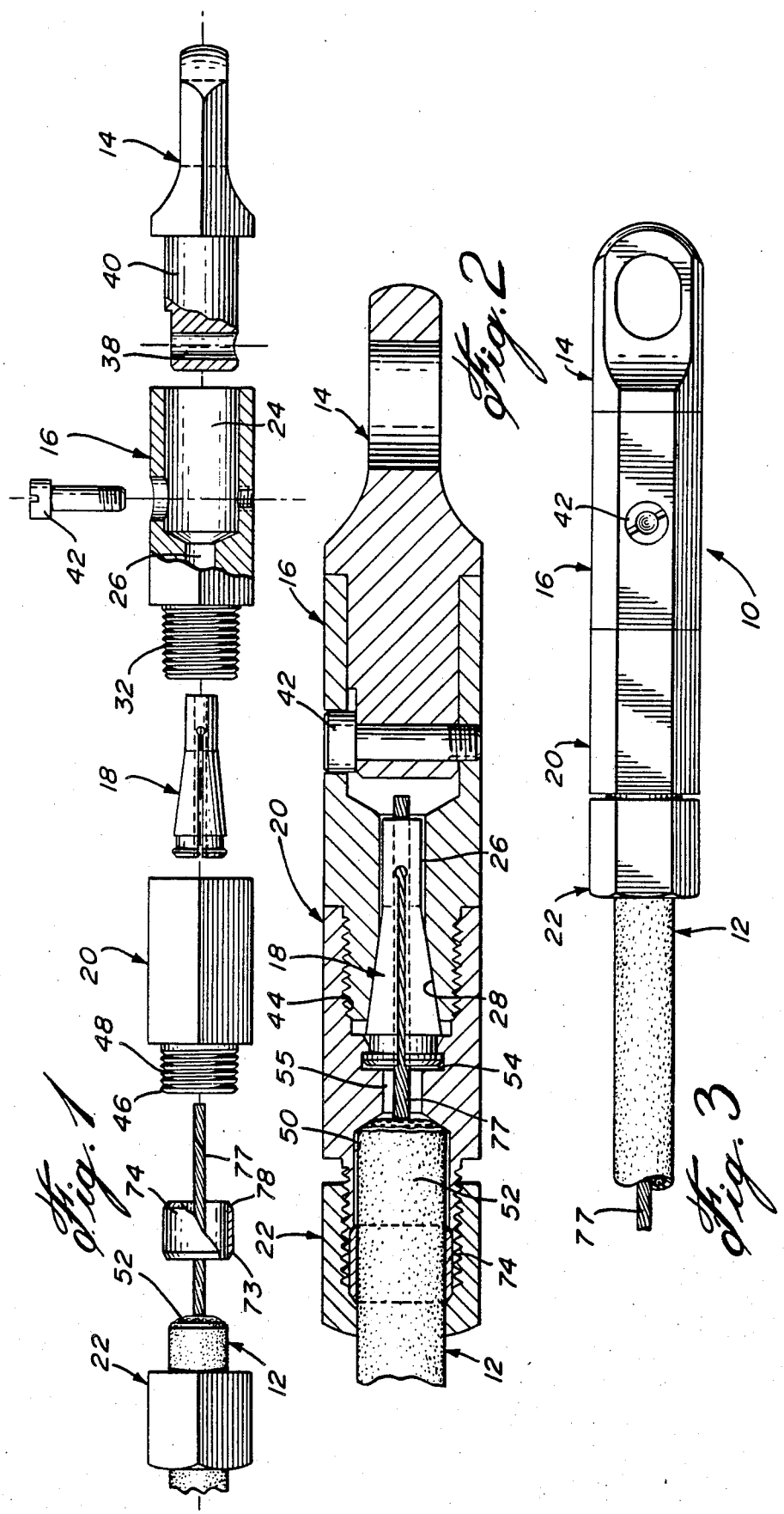

CABLE CLAMPING DEVICE

FIELD OF THE INVENTION

The present invention relates to a clamping device for a cable having one end stripped to leave a strength member extending centrally of the cable to project from the stripped end so as to provide some means for attaching the cable to an eye assembly used for pulling the cable during installation.

BACKGROUND OF THE INVENTION

The installation of a cable in an underground duct or over telephone poles is usually carried out by pulling the cable with a winch. A pulling cable is connected to the cable to be pulled through a pulling eye assembly that includes a device holding or clamping the end of the cable to be installed.

Clamping devices of the type having a component engaging the central strength member of a cable are known. For example, U.S. Pat. No. 4 337 923, issued July 6, 1982, to J. A. Smith, describes a locking apparatus that includes a plurality of set screws which crimp and secure the strength member to the pulling device. However, the devices of such construction present some problems. For example, in the above-referred U.S. patent, a tubular sleeve portion of the device is crimped at a plurality of locations to pressure seal the tube to the cable; this damages the optical fibers which extend between the outer sheath of the cable and the strength member. Furthermore, such clamping arrangement results in permanently affixing the clamping device to the cable; hence, whenever it is required to remove the device from the cable, the cable must be cut and a new clamping device must be installed, again crimping it to the cable.

OBJECTS AND STATEMENT OF THE PRESENT INVENTION

An object of the present invention is to provide a clamping device which may be installed to the stripped end of a cable in a manner that avoids the above-described problems of the prior art devices in that, at installation, no damage is made to the optical fibers of the cable end, once installed, the device may be disassembled without having to cut the cable.

The present invention, therefore, relates to a device for clamping the stripped end of a cable what includes a centrally extending strength member projecting from the stripped end, which comprises, in its broadest aspect:

a body having one end defining a tapered socket;

wedge means cooperatingly engaging the socket and adapted to receive, centrally thereof, the projecting strength member; and wedge driving means having on end adapted to be mounted at the stripped end of the cable and the opposite end adapted to engage the socket and of the body whereby engagement of the wedge driving means with the body forces the wedge means in the tapered socket to tightly grip the strength member.

In one preferred form of the invention, the wedge means consist of a collet through which the strength member extends and which includes a frustum-shaped portion defined by segmental portions which engage the socket end of the body as the various parts are forced into engagement to one another.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

For a better understanding of the present invention, reference is had to the following description taken in conjunction with the accompanying drawings in which:

FIG. 1 is an exploded view of the clamping device according to the present invention adapted to be mounted to a fiber optic cable;

FIG. 2 is a longitudinal cross-sectional view of the assembled clamping device;

FIG. 3 is a longitudinal view of the assembled clamped device;

DESCRIPTION OF PREFERRED EMBODIMENTS

Figure 7:
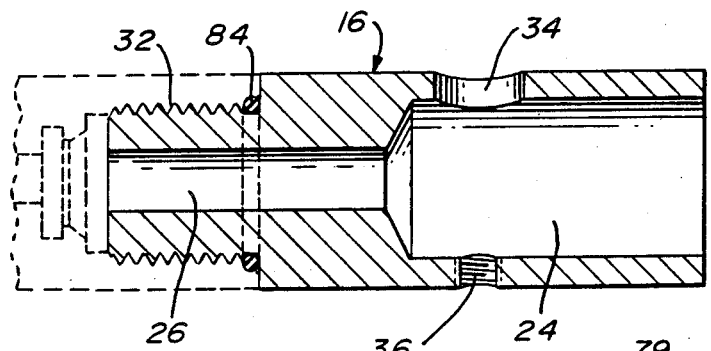
FIG. 7 is a longitudinal cross-section of the sleeve body showing a variant.

Referring to FIGS. 1-3, the clamping device, generally denoted 10 in FIG. 3, is shown mounted to one end of a cable 12 and comprises, at one end thereof, a pulling member 14 having an eye to receive the pulling cable of a winch (not shown). The clamping device 10 includes an elongated sleeve body 16, a wedge member 18, a wedge driving member 20 and a cable surrounding nut 22. Cable 12 is preferably of the type that includes a plurality of optical fibers extending between the centrally extending steel strength member 77 and the outer sheath of the cable.

The elongated sleeve body 16 has an axially-extending cylindrical bore 24 contiguous with a narrower passage 26 terminating with a frusto-conical-shaped opening 28 defining a tapered socket. The outer wall 32 of the socket end portion of a body is threaded. Bore 24 receives the shaft portion 40 of the pulling eye device 14 and includes a pair of openings 34 and 36 transversely aligned with an opening 38 in the shaft portion 40. A fastening screw 42 secures the pulling eye member 14 to the sleeve body 16.

The wedge driving member 20 comprises an internally threaded portion 44 adapted to engage the threaded portion 32 of body 16. The opposite end of the driving member includes a nipple 46 having a threaded portion 48 and a cylindrical bore 50 which is adapted to receive therein the end 52 of the cable 12. The interior portion of the wedge driving member also includes an annular recess 54 connecting with bore 50 through a narrow passage 55.

Figure 5:
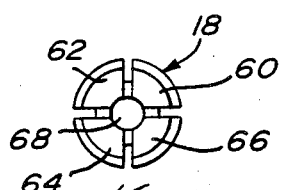
FIG. 5 is a side view of the wedge member as seen from the left of FIG. 4.
Figure 4:
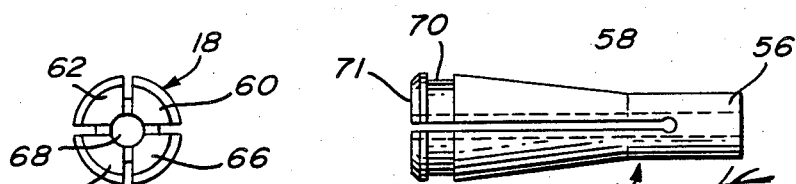
FIG. 4 is a plan view of the wedge member.

Referring to FIGS. 4 and 5, the wedge member 18 comprises a cylindrical portion 56 and a frusto-conical portion 58 formed, in the present embodiment, of four segmental portions 60, 62, 64, 66. The wedge portions 56 and 58 display a continuous central bore 68 to receive the strength member 77 of the stripped cable. The larger extremity of the frusto-shaped portion of the wedge member has a peripheral recess 70 defining for each segment a bead 71 which is adapted to be received in the annular recess 54 of the wedge driving member 20.

Figure 6:
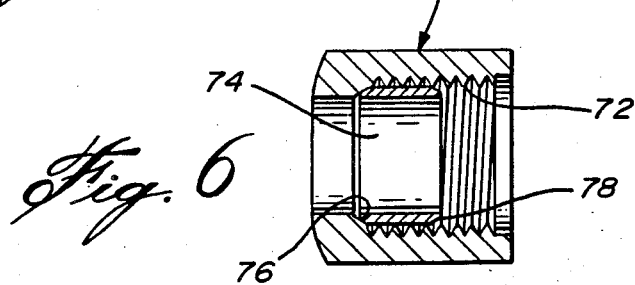
FIG. 6 is a cross-sectional view of the nut and bushing mounted at the stripped end of the cable.

Referring to FIG. 6, nut 22 has an interior threaded wall 72 which is engageable with the threaded portion 48 of the wedge driving member 20. The nut encloses therein a metallic ring 74 which has one end 73 (see FIG. 1) adapted to come in abutment against the inner inclined shoulder 76 of the nut.

The assembly of the clamping device 10 of the present invention to the fiber optic cable 12 will now be described. First, one end of the cable is stripped so as to leave the centrally extending metallic strength member 77 projecting. Then, nut 22 is slid over the sheath of the cable as well as ring 74. The wedge driving member 20 is subsequently slid over the projecting strength member 77 until end 52 of the cable abuts into the innermost wall 79 (see FIG. 8) of the bore 50. In the latter position, the strength member 77 projects through the central passageways 50 and 55 and through the threaded portion 44 of the member 20. Then, the wedge member 18 is slid over the strength member. The sleeve body 16 is threadedly engaged with member 20 thus receiving the wedge 18 within the tapered socket 28 and passageway 26 of the sleeve. Finally, the eye member 14 is inserted into bore 24 and is secured therein by screw 42. The assembly of parts 14, 16, 18 and 20 is then connected to nut 22 by threadedly engaging thread portion 48 to threaded portion 72.

A tightening tool is preferably used to forcingly secure the various parts tightly together so that the varius end walls of the parts come into abutment with one another as shown in FIG. 3. The driving engagement of the wedge member to body 16 causes head portions 71 of the wedge to slide along wall 28 forcing the segmental portions of the wedge to grasp the strength member. This action is carried until the bead portions fall into the annular recess 54.

Figure 8:
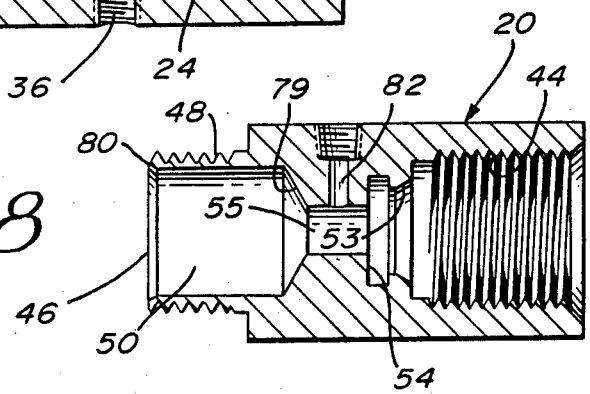
FIG. 8 is a longitudinal cross-section of the wedge driving member showing a variant.

Should it be a desire to introduce air pressure inside the cable, parts 16 and 20 are modified as illustrated in FIGS. 7 and 8. A hole 82 is made in the body of the wedge driving member 20 and terminates in passage 55 while an O-ring 84 is mounted on the threaded portion 32 of the sleeve body 16 to ensure an air-tight engagement between the two parts. While the assembly of FIG. 3 shows a gap between parts 20 and 22, for an air-tight assembly, the tool is used to further force the various parts towards one another. Thus, the extremity 78 of the ring contacts end wall 80 (see FIG. 8) of the nipple of the wedge driving member 20 and tigthening nut 22 onto the wedge driving member 20 causes the ring to adopt a bombed configuration (not shown) with the extremities 73 and 78 slightly penetrating the sheath of the cable.

Although the invention has been described above in relation to one specific form, it will be evident to the persons skilled in the art that it may be refined and modified in various ways. It is therefore wished to have it understood that the present invention should not be limited in scope except by the terms of the following claims.

The embodiments of the invention in which an exclusive property or privilege is claimed are defined as follows:

1. A device for clamping the stripped end of a cable having a strength member extending centrally of said cable and projecting from said stripped end thereof, and peripherally arranged conductors, comprising:
    a body having one end defining a tapered socket;
    wedge means cooperatingly engaging said socket and adapted to receive therethrough said projecting strength member;
    wedge driving means having one end adapted to be mounted at said stripped end of said cable and the opposite end thereof adapted to engage said socket end of said body whereby engagement of said wedge driving means with said body forces said wedge means in said tapered socket for tightening said wedge means on said strength member in order to tightly grip said strength member.

2. A device as defined in claim 1, wherein said wedge means comprise a collet including a cylindrical portion having an axially extending bore for receiving said strength member and a frustum-shaped portion constituted by at least two segmental portions.

3. A device as defined in claim 2, wherein said wedge driving means comprise an internally threaded portion and means for engagingly receiving the frustum-shaped portion of said wedge means; said socket end of said body having an externally threaded portion adapted to engage the internally threaded portion of said wedge driving means.

4. A device as defined in claim 3, wherein said frustum-shaped portion is constituted by four identical segmental portions loosely connected to each other at said cylindrical portion of said member.

5. A device as defined in claim 3, wherein said wedge driving means includes a threaded nipple extending at the end opposite said internally threaded portion and a nut engageable with said nipple; said nipple including a cylindrical bore for receiving said stripped end of said cable therein.

6. A device as defined in claim 5 further comprising a metallic ring to grasp the outside sheath of said cable.

7. A clamping device as defined in claim 2 wherein said body includes a cylyindrical bore opposite said socket end to receive therein an eyelet member; said body further including means for securing said eyelet member in said cylindrical bore.

8. A device as defined in claim 1, wherein said wedge driving means include opening means allowing air pressure to be created inside said clamping device when assembled to said cable; air-sealing means between said body and said wedge driving means.

9. A device for clamping the stripped end of a cable having a strength member extending centrally of said cable and projecting from said stripped end thereof, and peripherally arranged conductors comprising:
    a body having an axially extending bore and one end of said body defining a tapered socket;
    wedge means cooperatingly engaging said socket and having an axially extending bore adapted to receive therethrough said projecting strength member, said wedge means having a segmented frustum-shaped portion;
    wedge driving means having one end adapted to be mounted at said stripped end of said cable and the opposite end thereof adapted to engage said socket end of said body whereby engagement of said wedge driving means with said body forces said wedge means in said tapered socket for tightening said wedge means on said strength member in order to tightly grip said strength member by said segmented portions.

10. The device as defined in claim 9 wherein said wedge driving means includes an internally threaded portion and said socket end of said body includes an externally threaded portion adapted to engage the internally threaded portion of said wedge driving means.

* * * * *

UNITED STATES PATENT AND TRADEMARK OFFICE
CERTIFICATE OF CORRECTION

PATENT NO. : 4,635,989

DATED : January 13, 1987

INVENTOR(S) : Paul Tremblay and Georges Tzabanakis

It is certified that error appears in the above-identified patent and that said Letters Patent is hereby corrected as shown below:

Column 1, Line 47 - "end" should be --and--

Column 1, Line 50 - "what" should be --that--

Column 1, Line 58 - "on" should be --one--

Column 1, Line 60 - "and" should be --end--

Column 2, Line 23 - "clamped" should be --clamping--

Column 3, Line 34 - "thread" should be --threaded--.

Signed and Sealed this

Twenty-eighth Day of April, 1987

*Attest:*

DONALD J. QUIGG

*Attesting Officer*    *Commissioner of Patents and Trademarks*